May 30, 1972     D. C. SCHLUDERBERG     3,666,622
NUCLEAR REACTOR VAPOR SUPPRESSING MEANS
Filed May 13, 1969
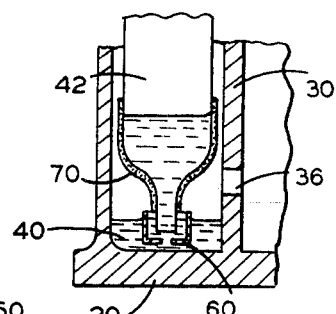
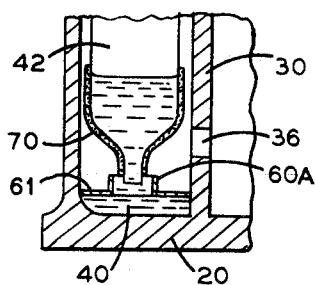
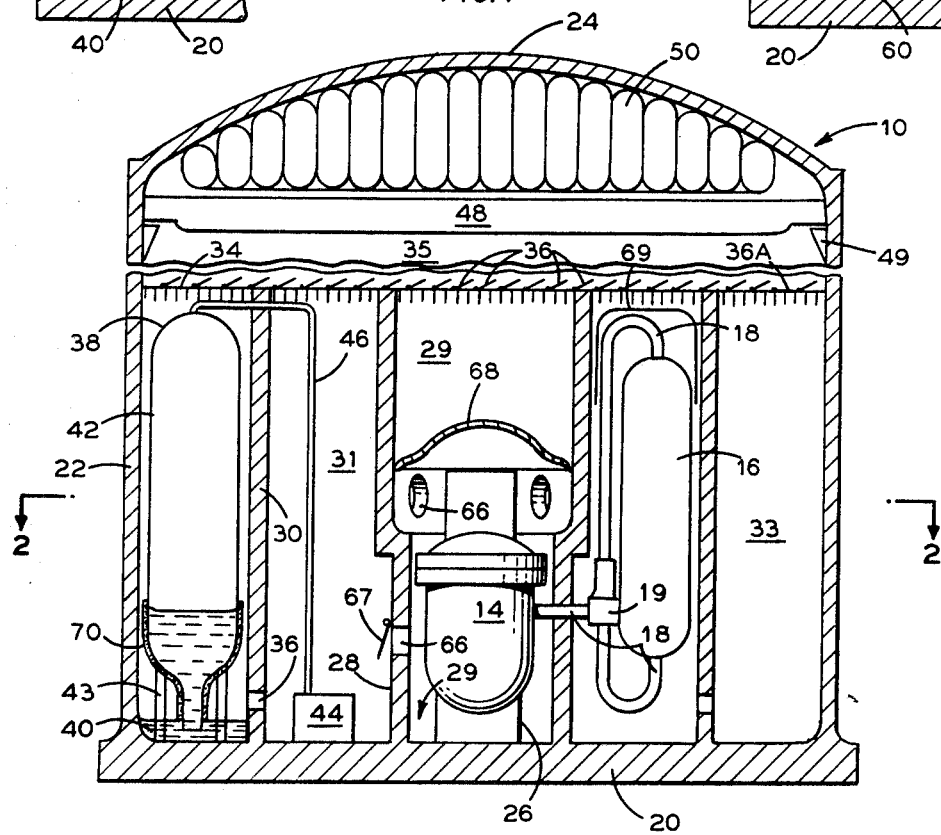
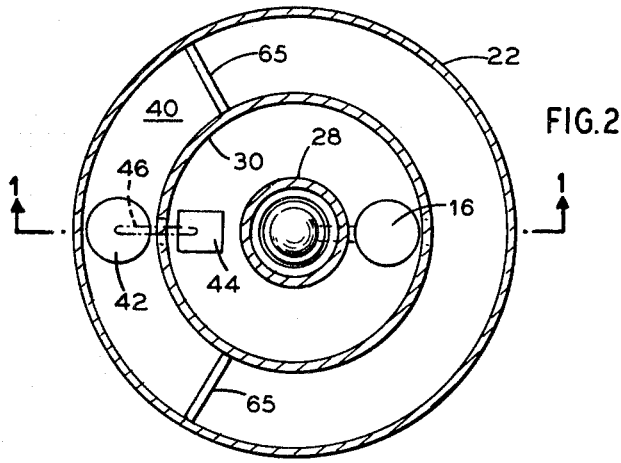
INVENTOR.
Donald C. Schluderberg
BY
*J. Maguire*
ATTORNEY

United States Patent Office 3,666,622
Patented May 30, 1972

3,666,622
NUCLEAR REACTOR VAPOR SUPPRESSING MEANS
Donald C. Schluderberg, Lynchburg, Va., assignor to The Babcock & Wilcox Company, New York, N.Y.
Filed May 13, 1969, Ser. No. 824,044
Int. Cl. G21c 9/00
U.S. Cl. 176—38    8 Claims

ABSTRACT OF THE DISCLOSURE

An improvement in apparatus for suppressing vapor pressure buildup within a nuclear reactor containment due to an accident in a reactor system, such as a rupture of the primary coolant system, or other event which produces vapor within the containment. The improvement is in providing an upright tank, the lower end of which is open and immersed in a pool fluid, such as water, within the containment; and providing evacuating means connected to the other end of the tank to continuously maintain the surface level of pool fluid internally of the tank higher than the level thereof externally of the tank. Since the pool fluid externally of the tank is exposed to vapor produced as a result of a vapor producing event, its surface level is lowered as pressure builds up within the containment, allowing the vapor to enter the tank and be condensed, thereby preventing the further buildup of vapor pressure within the containment.

BACKGROUND AND SUMMARY OF THE INVENTION

Reactor systems are generally enclosed in substantially leaktight containment structures made of either concrete or steel in order to limit or totally prevent radioactive materials such as steam or water, solid or dissolved fission products, or gaseous or vaporized fission products from escaping from the vicinity of the reactor complex in the event of a reactor accident. Alternate approaches to containment design require the structure to be either a relatively thin-walled enclosure of a large volume or thick-walled enclosure of a small volume. In the former case, low pressures would be developed within the structure in the event of an accident; whereas in the latter case, high pressures would be developed. In either case, the containment represents a considerable portion of the total cost of a nuclear reactor plant since the containment structure is designed to prevent the escape of vapor generated when an accident occurs which releases substantially all of the primary coolant of the reactor system.

In the prior art, ancillary equipment has been provided to suppress vapor pressure within the containment with a view to reducing the cost of construction of a given containment. The savings are realized on the theory that if the vapor pressure can be rapidly suppressed, a given containment can be designed to withstand a lower pressure. On the other hand, if the containment is not redesigned in consideration of the use of such ancillary equipment, its use can be readily justified on the basis of being a safety feature that contributes to the overall safe operation of a nuclear reactor complex, a consideration of particular importance to the industry since it is highly desirable to locate nuclear reactor installations in metropolitan areas.

The present invention is concerned with providing such ancillary equipment and more particularly with an improvement in apparatus for suppressing vapor pressure buildup within a containment housing nuclear reactor means which may produce a condensible vapor within the containment. The improvement comprises an upright tank having a closed upper end and an open lower end, a pool of fluid disposed within the containment, the open end of the tank immersed in the pool to allow fluid from the pool to freely enter the tank, and evacuating means connected to the upper end of the tank. The evacuating means is provided to continuously maintain the surface level of pool fluid internally of the tank at a higher level than the level thereof externally of the tank. It will thus be apparent that the pool fluid acts to form a liquid seal between the containment housing and the space above the pool fluid within the tank. In the event of a vapor pressure buildup within the containment, at least a portion of the surface level of the pool fluid externally of the tank is lowered with respect to the level thereof internally of the tank, permitting the vapor to enter the open end of the tank wherein it is condensed, thereby reducing the buildup of vapor pressure within the containment.

BRIEF DESCRIPTION OF THE DRAWINGS

FIG. 1 is a sectional side view of a reactor containment taken substantially along the line 1—1 of FIG. 2.

FIG. 2 is a sectional plan view of the nuclear reactor containment of FIG. 1 taken substantially along the line 2—2 of FIG. 1.

FIG. 3 is a sectional side view of a portion of the containment of FIG. 1.

FIG. 4 is a view similar to FIG. 3.

DESCRIPTION OF THE PREFERRED EMBODIMENTS

Referring now to the drawings wherein like reference numerals designate like or corresponding parts throughout the several views there is shown in FIG. 1 a containment structure 10 which houses a nuclear reactor system comprising a nuclear reactor 14 and heat exchanger 16 connected in primary coolant flow communication with one another via an arrangement of conduits 18, one of which contains a circulating pump 19. The containment shown in FIGS. 1 and 2 is illustrative of a typical enclosure for housing a nuclear reactor means and is intended to be representative of other forms of compartmentalized enclosures to which the improved pressure suppression arrangement hereinafter described may be adapted without departing from the spirit and scope of the invention. In the preferred embodiment the containment structure 10 is a compartmentalized enclosure with a base portion 20, an annularly-shaped upright outer wall portion 22 and a suitably shaped roof portion 24.

The reactor system illustrated in FIGS. 1 and 2 is a simplified schematic of the primary coolant system of a pressurized water reactor complex. The reactor control system, additional primary coolant loops and other equipment well known in the art have been eliminated in order to simplify the discussion. The inventive arrangement is adaptable to any nuclear reactor means well known in the art which is housed in a containment within which condensible vapors may be produced. The discussion is herein limited to the suppression of condensible vapors produced in the containment in the event of an accidental rupture or leak in the primary coolant system of a pressurized water reactor complex, to present the preferred embodiment in an exemplary setting.

With the reactor system shown, the reactor 14 is disposed centrally of the containment and supported in place over the base 20 of the containment on a cylindrically shaped skirt 26. The containment is provided with an upright annularly-shaped inner wall 28 which acts as a primary shield, is located centrally of the containment, and extends upwardly from the base of the containment toward its roof 24. The wall 28 laterally encircles the reactor with shielding material approximately twice the height of the reactor and defines the upright wall portion of an inner compartment 29 which encloses the space immediately surrounding the reactor. The containment is further provided with an upright annularly-shaped intermediate wall 30. Wall 30 acts as a secondary shield and is located between the inner and outer walls 28 and 22 respectively. Wall 30 extends upwardly from the base of the containment toward its roof to terminate at approximately the same height as the inner wall. The intermediate wall laterally encircles the inner wall to define therewith the upright wall portions of an intermediate compartment 31 within the containment. The intermediate compartment encloses an annularly-shaped space between the inner and intermediate walls, the space within which the heat exchanger 16 is located. Since the intermediate wall is also laterally spaced apart from the outer wall, it defines therewith the upright wall portions of an outer compartment 33 within second annularly-shaped space between the intermediate and outer walls.

The base 20 of the containment and a grate 34, located within and below the roof of the containment and extending over the upper ends of the inner and intermediate walls and laterally thereof to the outer wall, complete compartments 29, 31, and 33, hereinbefore described. Grate 34 acts as a false roof and flooring within the containment. It is suitably connected to the outer wall, and with the roof 24 and outer wall 22 defines a chamber 35 above the compartments.

In accordance with the invention the outer compartment 33 is provided with a pool of fluid, designated 40, in which condensible vapors produced in the event of a rupture or leak in the primary coolant system of the reactor complex can be condensed; an upright tank, designated 42, having an open end immersed in the pool fluid to allow fluid from the pool to freely enter the tank; and evacuating means, designated 44, connected to the tank for continuously maintaining the surface level of the pool fluid internally of the tank at a higher level than the level thereof externally of the tank. It should be appreciated that if a vapor producing event occurs within the containment, and it is of sufficient magnitude to lower the surface level of the pool fluid externally of the tank to thereby expose the open end of the tank to vapor; the vapor will enter the tank, mix with the pool fluid therein and be condensed. In doing so, the buildup of vapor pressure within the containment will be suppressed.

It is understood, of course, that at least some of the normal gaseous atmosphere within the containment, be it air or some other suitable gas, will enter the tank with the vapor and be evacuated therefrom by the evacuating means.

To facilitate the transfer of vapor from the intermediate compartment 31 to the outer compartment 33, the lower end portion of the intermediate wall 30 is provided with one or more openings 36 through which vapor may pass. The opening 36 (or openings, as the case may be), is (are) formed through wall 30 above the base of the containment to allow for the possibility that the vacuum within tank 42 may be inadvertently broken, due for example, to a malfunction of the evacuating means. With this arrangement, if the contents of the tank are spilled into the bottom of the outer compartment, the intermediate wall prevents pool fluid from flowing into the intermediate compartment where it might needlessly damage auxiliary equipment located therein. The arrangement is not critical to the invention since the evacuating means, for example, may be otherwise located. The pool fluid is preferably disposed in a discrete well provided in the bottom of the outer compartment. For example, upright walls 65 (FIG. 2) extending upwardly from the base of the containment to a convenient height and between the intermediate and outer walls may be provided to limit the area of the bottom of the outer compartment which is covered with pool fluid. Thus, either a portion or the entire bottom of any of the compartments may be flooded with pool fluid without departing from the spirit and scope of the invention. In the preferred embodiment the pool fluid is preferably water or borated water, boron in the form of boric acid being added to the water to reduce the possibility of a post accident criticality of the reactor.

The tank may be supported in place over the pool fluid, open end down, by means well known in the art, for example, by structural steel members 43. As shown in FIG. 1, the tank 43 is preferably a pressure vessel of substantially uniform elongated annularly-shaped cross-section throughout its longitudinal length, is closed at its upper end and open at the other. The open end is necked inwardly of the longitudinally extending axis of the tank to form an opening of convenient size into the tank. Plural tanks 42 connected in series and/or parallel communication with one another via conduit 46 or connected to additionally provided separate evacuating means 44 may be provided without departing from the spirit and scope of the invention.

The evacuating means 44 is preferably any vacuum pump having its intake side connected to the upper end of the tank via a conduit 36 for evacuating the tank. The surface level of pool fluid within the tank is maintained higher than the level thereof outside of the tank by the vacuum pump, due to the difference in pressure created internally vs. externally of the tank by the vacuum pump. The evacuating means also includes a condenser well known in the art which is connected to the discharge side of the vacuum pump to condense any water vapor discharged from the vacuum pump, and an associated auxiliary pump and source of condenser coolant connected to the condenser by means well known in the art for continuously circulating condenser coolant through the source and condenser. In order to augment the volume of evacuated space available, the evacuating means may optionally include auxiliary vacuum augmentation tanks 50, hereinafter discussed in greater detail.

FIGS. 1 and 2 show the evacuating means primarily located within the intermediate compartment, with conduit 46 extending through the intermediate wall and into the outer compartment for connection to the upper end of the tank. The evacuating means need not be so located. Chamber 35 is provided with a crane 48 disposed beneath the roof of the containment structure and extending laterally between portions of the outer wall of the containment. The crane is rollably supported on an annularly shaped track 49 connected to the inner side of the outer wall. Since the crane is only used when the reactor is shut down, it may be used as a storage platform when the reactor is operational. Thus the evacuating means, including the vacuum pump, condenser, condenser coolant source and auxiliary pump, may be mounted on the crane without departing from the spirit and scope of the invention. Conduit 46 would then extend from the crane through the grate 34 and into the outer compartment rather than through the intermediate wall. A plurality of auxiliary vacuum tanks 50 may also be located on the crane and connected in series communication with one another and by means well known in the art. These tanks may then be connected in series with tank 42 and conduit line 46 to augment the evacuated space available above the surface level of the pool fluid within the tank 42 by the cumulative space enclosed by the auxiliary vacuum tanks 50. The evacuating means would then evacuate tank 42 through the auxiliary tanks 50. Of course, either the evacuating means or the auxiliary vacuum tanks may be located on the crane without departing from the spirit and scope of the invention.

In the event of a vapor producing event within the containment, it is desirable to rapidly lower the level of pool fluid externally of the tank to expose the mouth of the tank, thereby allowing vapor to enter the tank and to be condensed. The need for rapidity becomes clear when it is appreciated that it does not take more than 15 seconds for the pressure within the containment to maximize if the vapor producing event is a maximum credible accident. The invention arrangement is particularly suitable for the purpose of preventing the pressure from building up to a maximum within the containment in the event of such an accident and may be used in combination with other vapor suppression means, such as water sprays and the like, which do not act with the rapidity of the present arrangement.

The product of the depth of submersion of the mouth of the tank beneath the surface level of pool fluid externally of the tank, and the surface area of the pool fluid externally of the tank, determines the volume of pool fluid which must be moved into the tank before the mouth of the tank is exposed. This volume may be minimized by reducing the depth to which the mouth is submerged. However, as shown in FIGS. 3 and 4 it is a feature of the invention to provide a container 60 of axially elongated annular construction, mounted in place about the open end of the tank 44 so as to surround the lowermost portion of the tank, and particularly its open end, to aid in rapidly exposing the mouth of the tank to vapor.

In the embodiment of FIG. 3, the container is open-ended, but its upper end is provided with a much larger opening than the lower end. The opening in the lower end is made smaller since it is undesirable for fluid flow therethrough to interfere with the flow of vapor into the tank 44. In the preferred embodiment the container 60 is mounted with its open upper end located slightly above the surface level of the pool fluid externally of the tank while its lower end is located below the opening into the tank. With this innovation it should be appreciated that the volume of pool fluid which must be moved upwardly into the tank by vapor is determined by the volume contained within the container 60, rather than the much larger volume hereinbefore described.

FIG. 4 shows another embodiment of the means for rapidly allowing vapor to enter the tank. This embodiment is in all respects similar with the other except that the openings in both ends of the container 60A are the same size, and the container is mounted in place about the tank opening by means of a cover 61 enclosing the pool fluid within the well.

In operation it is desirable to limit the amount of air entrained by the vapor entering the tank, in order to prevent the rapid breakdown of the vacuum within the tank. To this end it is a feature of the invention that grate 34 be provided with a plurality of pivotally mounted plates 36, all but one of which are shown in their open position in FIG. 1. In this position air can freely pass upwardly from the compartments 29, 31, and 33, and into the chamber 35, whereas if the plates 36 are in the closed position, as exemplified by plate 36A, air cannot readily pass downwardly from the chamber 35 into the several compartments. To a certain degree the grate thus acts as a one way valve. When a vapor producing incident occurs within the containment, air forced upwardly into the chamber beneath the roof is prevented from returning to the compartments by reason of the one way valve characteristic of the grate.

In order to vent the inner compartment to the intermediate compartment one or more vent openings 66 are provided in the inner wall at a convenient level(s) above the base of the containment. To prevent the re-entry of vapor into the inner compartment after it has passed through the vent(s), each vent is preferably provided with a one way valve comprising a plate 67 pivotally mounted on the intermediate compartment side of the inner wall.

A low pressure dome 68 comprising a suitably shaped member fitted within the inner compartment above the reactor but below the grate, is provided to aid in directing vapor downwardly through the vent(s). Functionally, the shroud 69 mounted within the intermediate compartment over the heat exchanger by means well known in the art is provided for the same purpose, i.e., to direct vapor downwardly into the intermediate compartment in the event vapor is produced due to a failure in the reactor 14, heat exchanger 16 or conduits 18.

Thus, both the dome and shroud direct escaped vapor and fluid from the reactor system downwardly so as to displace air in the compartments away from opening 36, thereby reducing the amount of air entering tank 42.

It is an additional feature of the invention to provide insulating means 70 around the lower end portion of tank 42 to reduce heat transfer from the containment, to the pool fluid, through the walls of the tank. In the preferred embodiment means 70 is preferably any insulation which is compatible with the general operating and safety requirements of the plant. In practice, the tank is preferably evacuated sufficiently to raise the surface level of the water within the tank approximately 30 feet above the corresponding level thereof externally of the tank, thereby causing the temperature of the water within the tank to be lowered to approximately 40° F. In any event the tank is is preferably evacuated to the extent necessary to lower the temperature of the pool fluid therein to a temperature within the range of from 40° F. to 50° F. Of course, higher temperatures may be used as dictated by economic considerations. For example, low temperatures increase refrigeration loads whereas high temperatures require larger tanks 44.

What is claimed is:

1. Improved apparatus for suppressing vapor pressure buildup within a containment structure housing a nuclear reactor system operative with pressurized liquid coolant the improvement comprising an upright tank having a closed upper end and an open lower end, a pool of fluid disposed within the containment, the open end of the tank immersed in the pool to allow fluid fom the pool to freely enter the tank, the surface level of the pool fluid internally of the tank being higher than the corresponding level thereof externally of the tank, and evacuating means connected to the upper end of the tank for continuously maintaining such level differential, the surface level of at least a portion of the pool fluid externally of the tank being lowered with respect to the level thereof internally of the tank in response to the buildup of vapor pressure within the containment to allow vapor from the containment to enter the tank wherein the vapor is condensed thereby suppressing the further buildup of vapor pressure within the containment.

2. The apparatus according to claim 1 further comprising means for rapidly lowering said surface level of at least a portion of the pool fluid externally of the tank to allow vapor to enter the tank and be condensed therein.

3. The apparatus according to claim 2 wherein the rapid lowering means comprises an open ended annular member mounted around the open end of the tank.

4. The apparatus according to claim 2 wherein the rapid lowering means comprises a container having an open upper end and a closed lower end, and the lower end has an opening formed therein which is smaller than the opening of the upper end.

5. The apparatus according to claim 2 further comprising insulating means mounted around the lower end portion of the tank to reduce heat transfer from the containment to the pool fluid through the walls of the tank.

6. The apparatus according to claim 2 wherein the evacuating means comprises a vacuum pump and a plurality of auxiliary vacuum tanks through which the pump evacuates said tank having its open end immersed in the pool.

7. The apparatus according to claim 3 wherein the member is mounted in place around the tank via a connection to the tank.

8. The apparatus according to claim 3 wherein the member is mounted in place around the tank via a cover on the pool.

References Cited

UNITED STATES PATENTS

| | | | | |
|---|---|---|---|---|
| 3,056,736 | 10/1962 | Went et al. | 176—37 |
| 3,074,868 | 1/1963 | Turkevich | 176—37 |
| 3,166,479 | 1/1965 | Widell | 176—37 |
| 3,248,298 | 4/1966 | Horman | 176—37 |
| 3,375,162 | 3/1968 | Wilson | 176—38 X |
| 3,414,472 | 12/1968 | Chave | 176—37 |
| 3,444,725 | 5/1969 | Chave | 176—38 X |

CARL D. QUARFORTH, Primary Examiner
GARY G. SOLYST, Assistant Examiner

U.S. Cl. X.R.

176—87